United States Patent
Fuse et al.

(10) Patent No.: US 10,699,385 B2
(45) Date of Patent: Jun. 30, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Koji Fuse, Tokyo (JP); Hisashi Ishikawa, Urayasu (JP); Akitoshi Yamada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 15/982,315

(22) Filed: May 17, 2018

(65) Prior Publication Data
US 2018/0342047 A1    Nov. 29, 2018

(30) Foreign Application Priority Data
May 24, 2017    (JP) .................. 2017-102955

(51) Int. Cl.
*G06T 5/00* (2006.01)
*H04N 5/217* (2011.01)
*G06T 5/20* (2006.01)

(52) U.S. Cl.
CPC .............. *G06T 5/003* (2013.01); *G06T 5/002* (2013.01); *G06T 5/20* (2013.01); *H04N 5/217* (2013.01);
(Continued)

(58) Field of Classification Search
CPC ........... G06T 5/003; G06T 5/00; G06T 5/001; G06T 5/002; G06T 5/20;
(Continued)

(56) References Cited

U.S. PATENT DOCUMENTS 4,783,840 A * 11/1988 Song .................. G06T 5/20
                                                                382/261
5,081,692 A *  1/1992 Kwon .................. G06T 5/20
                                                                358/447
(Continued)

FOREIGN PATENT DOCUMENTS

JP    3334776 B2    10/2002
JP    5705391 B1     4/2015
(Continued)

*Primary Examiner* — Sean T Motsinger
(74) *Attorney, Agent, or Firm* — Rossi, Kimms & McDowell LLP

(57) ABSTRACT

Disclosed is an image processing apparatus including: a sharpness recovery unit configured to recover sharpness of an input image; a correlation determination unit configured to determine a correlation between a target pixel and peripheral pixels of the input image; a noise removal unit configured to perform smoothing of the target pixel determined as having a correlation with the peripheral pixels in a recovered image output from the sharpness recovery unit; and a switching unit configured to switch between a mode in which the correlation determination unit uses the target pixel and the peripheral pixels of the pre-recovery input image in the correlation determination and a mode in which the correlation determination unit uses the target pixel and the peripheral pixels of the recovered input image in the correlation determination, depending on recovery characteristics used in the determination of the correlation determination unit.

20 Claims, 10 Drawing Sheets

(52) U.S. Cl.
CPC ............... *G06T 2207/10008* (2013.01); *G06T 2207/10024* (2013.01); *G06T 2207/30176* (2013.01)

(58) Field of Classification Search
CPC . G06T 2207/10008; G06T 2207/10024; G06T 2207/30176; H04N 5/217
See application file for complete search history.

(56) References Cited

U.S. PATENT DOCUMENTS

| | | | | |
|---|---|---|---|---|
| 5,768,440 | A * | 6/1998 | Campanelli | G06T 5/20 358/463 |
| 6,665,448 | B1 * | 12/2003 | Maurer | G06K 9/44 382/261 |
| 6,731,821 | B1 * | 5/2004 | Maurer | G06K 9/40 382/263 |
| 8,699,816 | B2 * | 4/2014 | Han | G06T 5/002 348/571 |
| 2001/0022622 | A1 * | 9/2001 | Eiho | G06T 5/004 348/252 |
| 2006/0115135 | A1 * | 6/2006 | Dehmeshki | G06F 19/321 382/128 |
| 2009/0016635 | A1 * | 1/2009 | Takayama | G06T 5/004 382/266 |
| 2011/0075947 | A1 * | 3/2011 | Miyamoto | G06T 3/40 382/300 |
| 2013/0286289 | A1 * | 10/2013 | Yamada | G06T 5/003 348/687 |
| 2016/0093027 | A1 * | 3/2016 | Okamoto | G06T 5/002 382/162 |
| 2017/0061234 | A1 * | 3/2017 | Lim | G06K 9/4661 |
| 2018/0342047 | A1 * | 11/2018 | Fuse | G06T 5/002 |

FOREIGN PATENT DOCUMENTS

| | | |
|---|---|---|
| JP | 2015109562 A | 6/2015 |
| WO | 2015198368 A1 | 12/2015 |

* cited by examiner

FIG.9

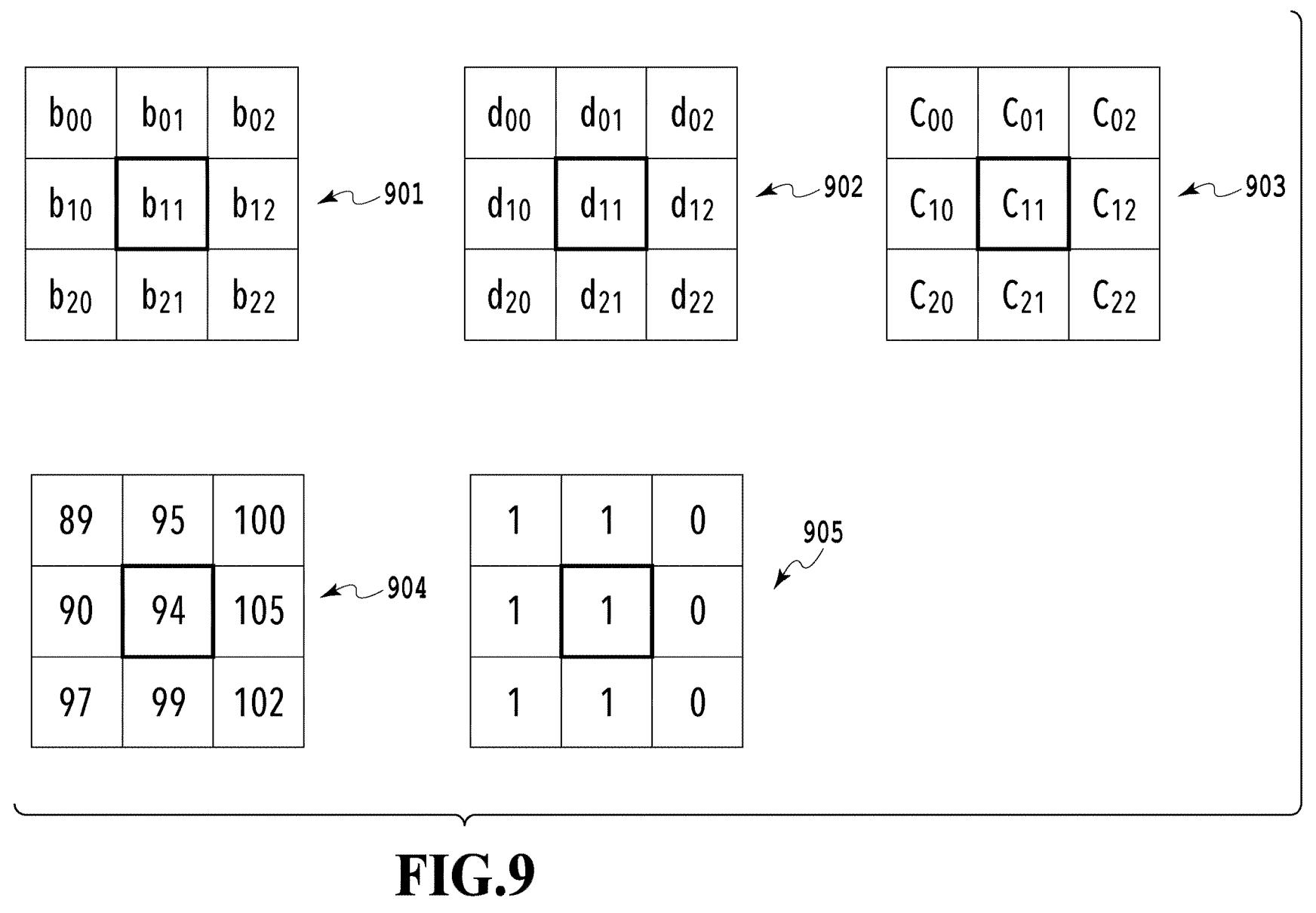

|  |  |  |
|---|---|---|
| $c_{02}$ | $c_{12}$ | $c_{22}$ |
| $c_{01}$ | $c_{11}$ | $c_{21}$ |
| $c_{00}$ | $c_{10}$ | $c_{20}$ |

903

|  |  |  |
|---|---|---|
| $d_{02}$ | $d_{12}$ | $d_{22}$ |
| $d_{01}$ | $d_{11}$ | $d_{21}$ |
| $d_{00}$ | $d_{10}$ | $d_{20}$ |

902

|  |  |  |
|---|---|---|
| 0 | 0 | 0 |
| 1 | 1 | 1 |
| 1 | 1 | 1 |

905

|  |  |  |
|---|---|---|
| $b_{02}$ | $b_{12}$ | $b_{22}$ |
| $b_{01}$ | $b_{11}$ | $b_{21}$ |
| $b_{00}$ | $b_{10}$ | $b_{20}$ |

901

|  |  |  |
|---|---|---|
| 100 | 105 | 102 |
| 95 | 94 | 99 |
| 89 | 90 | 97 |

904

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium, and more particularly, to an image sharpness recovery technology.

Description of the Related Art

As one of defects that degrade image quality in an image obtained by a digital camera, an image scanner, or the like, degradation in sharpness (so called "blurring") caused by an optical system is known in the art. Japanese Patent Laid-Open No. 2015-109562 discusses a technique of recovering (correcting or restoring) degraded sharpness by applying a digital filter based on a modulation transfer function (MTF) of an optical system to the obtained image. In addition, as a technique similar to the recovery processing discussed in Japanese Patent Laid-Open No. 2015-109562, Japanese Patent No. 5705391 discusses a technique of improving sharpness of an enlarged image by applying super resolution processing to the image enlarged by zoom in/out processing such as a bilinear method.

Incidentally, in the field of image processing, it is generally known that noise contained in an image is also amplified as the sharpness is improved. Japanese Patent No. 3334776 discusses a technique of reducing noise without degrading sharpness (hereinafter, referred to as an "edge-saving type noise reduction process"). That is, a difference absolute value between a target pixel and peripheral pixels is compared with a predetermined threshold value, and only peripheral pixels having a high correlation with the target pixel (peripheral pixels having a difference absolute value smaller than the predetermined threshold value) are employed in a smoothing process, so that noise is reduced without degrading sharpness. In addition, Japanese Patent Laid-Open No. 2015-109562 further discusses a technique of recovering sharpness of an obtained image and reducing noise by applying the edge-saving type noise reduction process similar to that of Japanese Patent No. 3334776 to the image having sharpness recovered through the recovery processing.

SUMMARY OF THE INVENTION

In view of the aforementioned background, the present invention provides a technique that implement a noise reduction process depending on sharpness recovery characteristics.

According to an aspect of the invention, there is provided an image processing apparatus including: a sharpness recovery unit configured to recover sharpness of an input image; a correlation determination unit configured to determine a correlation between a target pixel and peripheral pixels of the input image; a noise removal unit configured to perform smoothing of the target pixel determined as having a correlation with the peripheral pixels in a recovered image output from the sharpness recovery unit; and a switching unit configured to switch between a mode in which the correlation determination unit uses the target pixel and the peripheral pixels of the pre-recovery input image in the correlation determination and a mode in which the correlation determination unit uses the target pixel and the peripheral pixels of the recovered input image in the correlation determination, depending on recovery characteristics used in the determination of the correlation determination unit.

Further features of the present invention will become apparent from the following description of exemplary embodiments with reference to the attached drawings.

BRIEF DESCRIPTION OF THE DRAWINGS

FIG. 9 is schematic diagrams each illustrating a target region having 3×3 pixels.

DESCRIPTION OF THE EMBODIMENTS

Before a description for an embodiment of the invention, an example of the related art will be described, in which an edge-saving type noise reduction process is applied after the sharpness recovery processing. Here, for simplicity of explanation, an example of processing one-dimensional image data will be described. Note that a resolution of the one-dimensional image data is set to 600 dpi.

Figure 1:
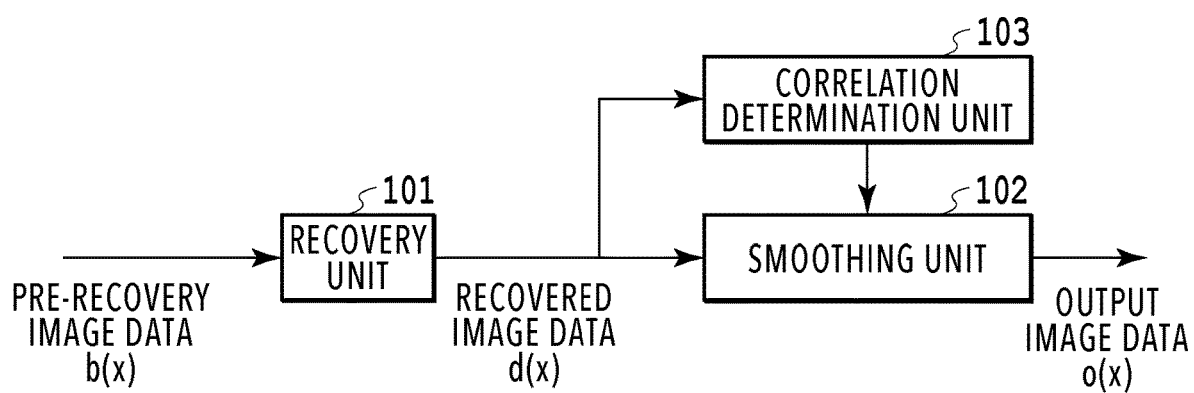
FIG. 1 is a block diagram illustrating an exemplary configuration for applying a recovery and noise reduction process in the related art.
Figure 2:
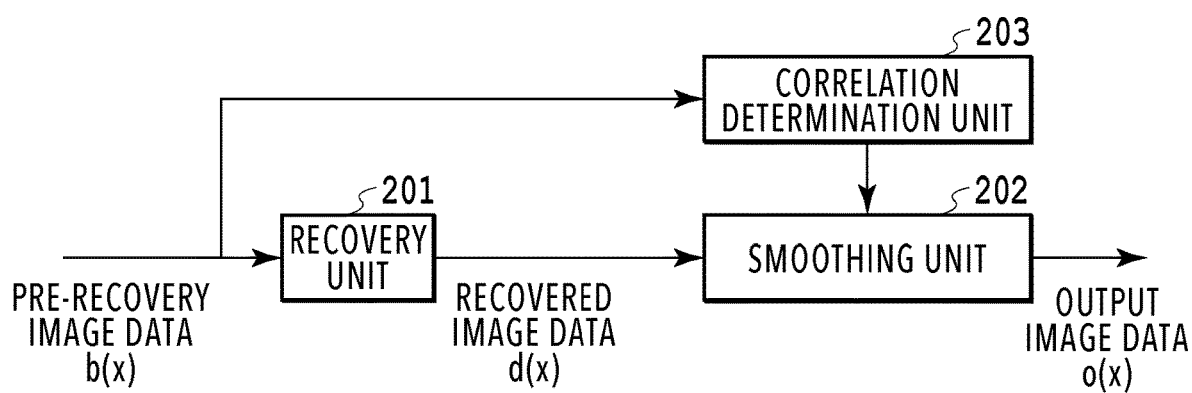
FIG. 2 is a block diagram illustrating an exemplary configuration for applying the recovery and noise reduction process in the related art.

FIGS. 1 and 2 are block diagrams illustrating exemplary configurations for applying the edge-saving type noise reduction process to recovered image data subjected to the sharpness recovery processing. While the recovered image data is used in correlation determination in FIG. 1, pre-recovery image data prior to the sharpness recovery processing is used in the correlation determination of FIG. 2. The configuration of FIG. 2 corresponds to techniques of Japanese Patent Laid-Open No. 2015-109562 and Japanese Patent No. 5705391. That is, in the techniques discussed in Japanese Patent Laid-Open No. 2015-109562 and Japanese Patent No. 5705391, it is expected that the image quality of the image corresponding to the image data is improved by using image data before noise is amplified in the course of the sharpness improvement process in the correlation determination. Note that the expression "image quality is improved" means that noise is effectively reduced while sharpness is maintained (this similarly applies to the following description).

However, the inventors made diligent studies and found that, depending on frequency characteristics of a digital filter used in the recovery processing (hereinafter, also referred to as a "recovery filter"), image quality is contrariwise degraded in a case where the pre-recovery image data is used in the correlation determination. Note that the expression "image quality is degraded" means that the sharpness is degraded, or it is difficult to sufficiently reduce noise (this similarly applies to the following description). An example in which the image quality is degraded by using the pre-recovery image data in the correlation determination will be described with reference to FIGS. 3 and 4.

Figure 3:
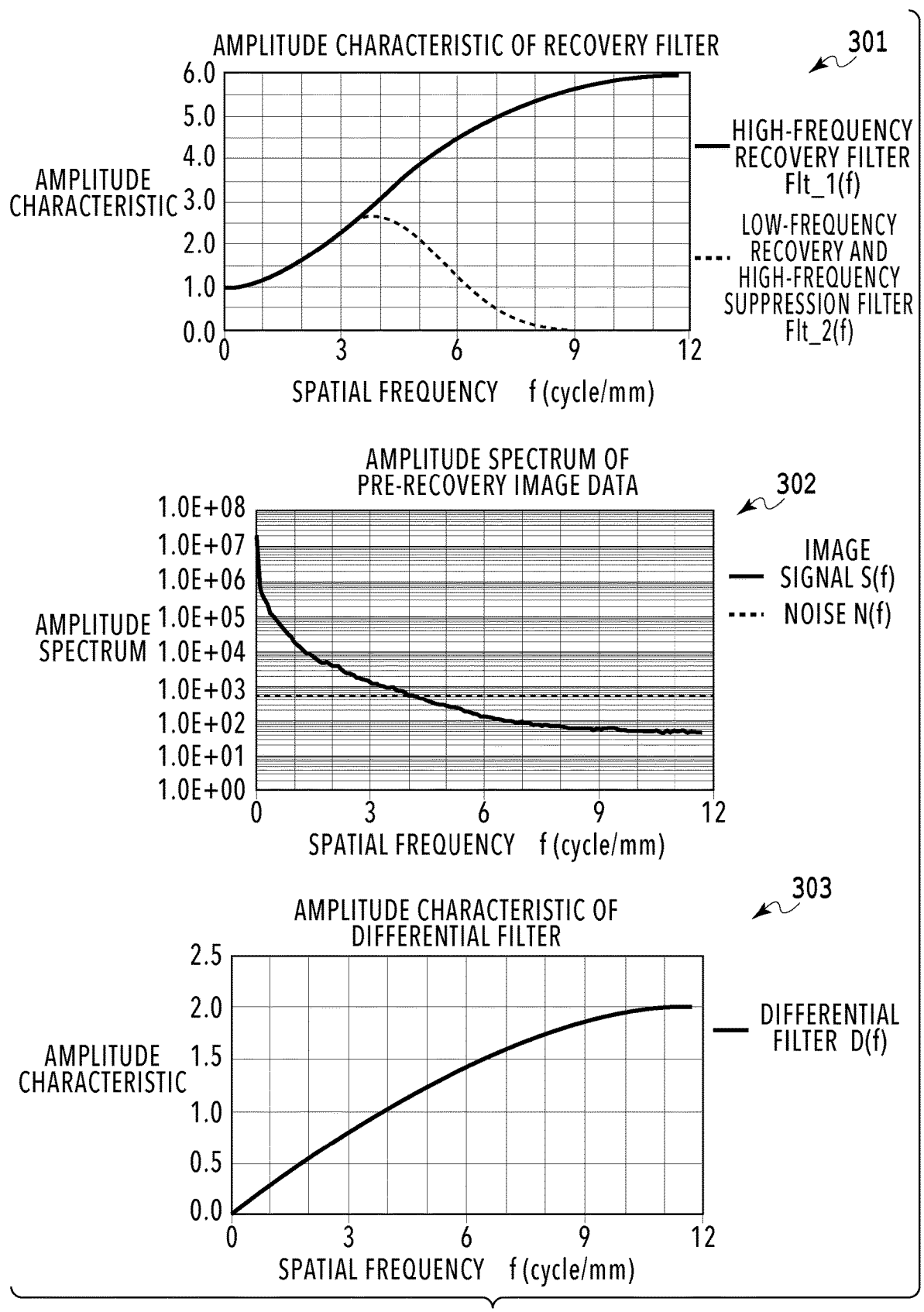
FIG. 3 is graphs each illustrating an amplitude spectrum and an amplitude characteristic.

In the graph 301 of FIG. 3, the abscissa refers to a spatial frequency f, and the ordinate refers to an amplitude characteristic of the recovery filter. As recognized from a high-frequency recovery filter Flt_1(f), in a case where the amplitude characteristic of the filter is larger than "1" across overall frequency regions excluding a frequency "f=0 cycle/mm", the image quality is improved by using the pre-recovery image data in the correlation determination rather than the recovered image data. Meanwhile, as recognized from the low-frequency recovery and high-frequency suppression filter Flt_2(f), in a case where the amplitude characteristic of the filter is smaller than "1" in a high-frequency region, the image quality is contrariwise degraded by using the pre-recovery image data in the correlation determination rather than the recovered image data. That is, in a case where the low-frequency recovery and high-frequency suppression filter is used in the recovery processing, the image quality is improved by using the recovered image data in the correlation determination rather than the pre-recovery image data. A configuration that causes such a result will be described. Note that, here, it is assumed that noise having a constant strength (white noise) regardless of frequency is reduced.

Each of recovery units 101 and 201 performs a convolution operation with the one-dimensional pre-recovery image data $b(x)$ by using recovery filters having the same configuration, and outputs one-dimensional recovered image data $d(x)$. In this case, "x" denotes a pixel position in an input image.

A smoothing unit 102 and a correlation determination unit 103 perform the edge-saving type noise reduction process similar to that of the technique discussed in Japanese Patent No. 3334776. Similarly, a smoothing unit 202 and a correlation determination unit 203 also perform the edge-saving type noise reduction process. In the following description, for simplicity of explanation, a specific example will be described, in which the edge-saving type noise reduction process is performed using a pair of pieces of data (pixel values) in the positions x and (x+1), and output image data $o(x)$ corresponding to the position x is output.

Both the correlation determination units 103 and 203 determine whether or not there is a correlation between the pixel value of the target pixel (hereinafter, referred to as a "target pixel value") and pixel values of peripheral pixels around the target pixel (hereinafter, referred to as "peripheral pixel values"). Similar to the technique discussed in Japanese Patent No. 3334776, the correlation determination is performed by comparing a difference absolute value between the target pixel value and the peripheral pixel value with a predetermined threshold value. In this example, a pair of pixel values at the positions x and (x+1) are used. In the examples of FIGS. 1 and 2, it is assumed that the pixel value at the position x is the target pixel value, and the pixel value at the position (x+1) is the peripheral pixel value.

The correlation determination unit 103 determines that the peripheral pixel value of the position (x+1) has a correlation with the target pixel value of the position x in a case where the difference absolute value between $d(x)$ and $d(x+1)$ is smaller than the predetermined threshold value. Meanwhile, the correlation determination unit 203 determines that the peripheral pixel value of the position (x+1) has a correlation with the target pixel value of the position x in a case where the difference absolute value between $b(x)$ and $b(x+1)$ is smaller than the predetermined threshold value.

Similar to the technique discussed in Japanese Patent No. 3334776, the smoothing units 102 and 202 perform smoothing only for the peripheral pixel value having a high correlation with the target pixel value by using the smoothing filters having the same configuration to remove noise without degrading sharpness of the input image. In this example, since a pair of pixel values of the positions x and (x+1) are used, the pixel value of the position (x+1) is used in smoothing in a case where it is determined that there is a correlation between the pixel value of the position x and the pixel value of the position (x+1). Specifically, in a case where it is determined that there is a correlation between the pixel value of the position x and the pixel value of the position (x+1), a value obtained by adding $d(x)$ and $d(x+1)$ and dividing the sum by "2" is output as an output image data $o(x)$. Meanwhile, in a case where it is determined that there is no correlation between the pixel value of the position x and the pixel value of the position (x+1), the pixel value of the position (x+1) is not used in smoothing. Therefore, in a case where it is determined that there is no correlation between the pixel value of the position x and the pixel value of the position (x+1), $d(x)$ is output as the output image data $o(x)$.

As described above, depending on the frequency characteristics of the recovery filter, two types of results are obtained, including a case where the image quality is improved by using the recovered image data in the correlation determination and a case where the image quality is improved by using the pre-recovery image data in the correlation determination. This is caused by a fact that the accuracy of the correlation determination is degraded due to the noise amplified along with the sharpness improvement process. In this regard, a signal-to-noise (S/R) ratio of the difference absolute value employed in the correlation determination is evaluated. Since accuracy of the difference absolute value is improved as the S/N ratio of the difference absolute value increases, the correlation determination becomes accurate, and the image quality is improved. A change of the S/N ratio of the difference absolute value depending on a frequency characteristic of the recovery filter will be described.

Here, in order to evaluate the S/N ratio of the difference absolute value, the input image data (pre-recovery image data) is divided into image signal data having no noise and noise data. In the graph 302 of FIG. 3, the abscissa refers to a spatial frequency f, and the ordinate refers to an amplitude spectrum of the pre-recovery image data. Note that, in both graphs of FIGS. 3 and 4, the Nyquist frequency is set to approximately 11.8 cycles/mm (=600÷25.4÷2 cycles/mm). In general, an image signal is characterized in that a correlation with adjacent pixels is high, and only a few edge regions including high frequency components appear. For this reason, the amplitude spectrum S(f) of the image signal is reduced as the spatial frequency f increases. Meanwhile, the noise randomly changes regardless of the level of the spatial frequency. In the example of the graph 302 of FIG. 3, the amplitude spectrum N(f) of noise corresponding to the spatial frequency f becomes nearly constant across overall frequency bands. That is, in this example, it is assumed that the noise is white noise.

Figure 4:
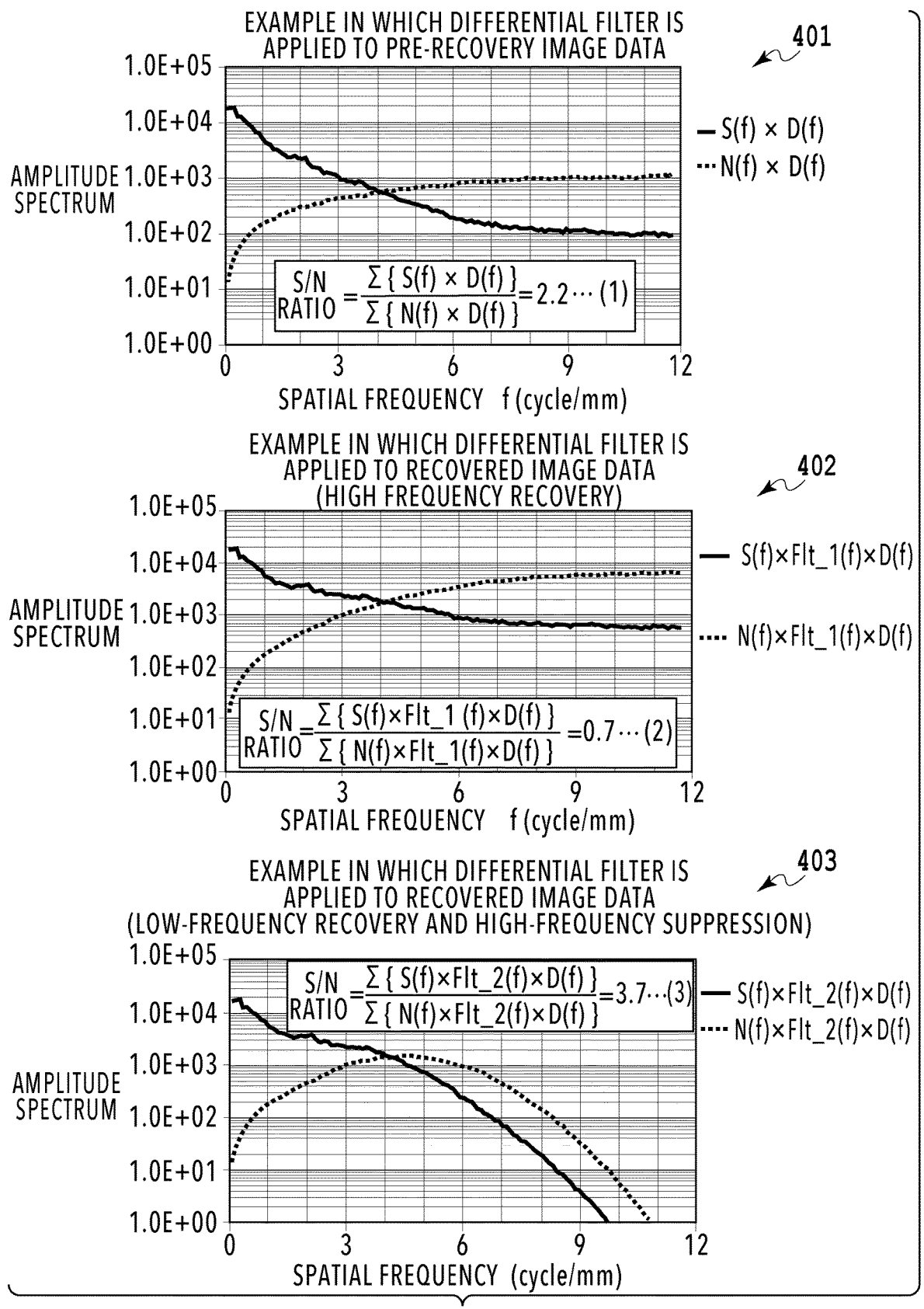
FIG. 4 is graphs each illustrating an amplitude spectrum.

In a case where the pre-recovery image data is used in the correlation determination, the correlation is determined by the difference absolute value between b(x) and b(x+1) in the pre-recovery image data. Here, an amplitude characteristic of the filter for obtaining a pixel value difference between adjacent pixels (hereinafter, referred to as a "differential filter") is denoted by "D(f)". In the graph 303 of FIG. 3, the abscissa refers to a spatial frequency f, and the ordinate refers to an amplitude characteristic D(f) of the differential filter. In addition, assuming that "$f_N$" denotes the Nyquist frequency, the amplitude characteristic D(f) becomes $\sqrt{(2(1-\cos(\pi f/f_N))}$ as illustrated in the graph 303 on the basis of the signal processing theory known in the art. By applying the differential filter to the pre-recovery image data, as illustrated in the graph 401 of FIG. 4, the amplitude spectrum of the image signal becomes "S(f)×D(f)", and the amplitude spectrum of noise becomes "N(f)×D(f)". Therefore, the S/N ratio of the difference absolute value becomes a value obtained by dividing a value obtained by summing "S(f)×D(f)" with respect to the spatial frequency f by a value obtained by summing "N(f)×D(f)" with respect to the spatial frequency f, as expressed in the following Formula (1). In the example of FIGS. 3 and 4, an evaluation value indicating accuracy of the correlation determination becomes "2.2" on the basis of Formula (1).

$$S/N \text{ ratio} = \frac{\sum\{S(f) \times D(f)\}}{\sum\{N(f) \times D(f)\}} = 2.2 \quad (1)$$

Then, an S/N ratio of the difference absolute value in a case where the recovered image data is used in the correlation determination is calculated. Here, it is assumed that two types of filters described below are employed as a filter used in the recovery unit 101. It is assumed that the two types of filters have amplitude characteristics illustrated in the graph 301. The first filter is a high-frequency recovery filter Flt_1(f), and the second filter is a low-frequency recovery and high-frequency suppression filter Flt_2(f). The recovered image data used in the correlation determination is obtained by applying such a recovery filter to the pre-recovery image data b(x).

By applying the high-frequency recovery filter Flt_1(f) to each of the image signal S(f) and the noise N(f) illustrated in the graph 302, the amplitude spectra of the recovered image data become "S(f)×Flt_1(f)" and "N(f)×Flt_1(f)". Similarly, by applying the low-frequency recovery and high-frequency suppression filter Flt_2(f) to each of the image signal S(f) and the noise N(f), the amplitude spectra of the recovered image data become "S(f)×Flt_2(f)" and "N(f)×Flt_2(f)".

In a case where the recovered image data is used in the correlation determination, the correlation is determined by the difference absolute value between d(x) and d(x+1) of the recovered image data. Similar to the aforementioned method, in the correlation determination, the pixel value difference between adjacent pixels is obtained using the differential filter having the amplitude characteristic D(f) of the graph 303. In a case where the differential filter is applied to the recovered image data using the high-frequency recovery filter Flt_1(f), the amplitude spectrum of the signal becomes "S(f)×Flt_1(f)×D(f)", and the amplitude spectrum of the noise becomes "N(f)×Flt_1(f)×D(f)". In the graph 402, the abscissa refers to the spatial frequency f, and the ordinate refers to the amplitude spectrum of the recovered image data (high-frequency recovery). In the graph 402, the amplitude spectrum of the image signal "S(f)×Flt_1(f)×D(f)" and the amplitude spectrum of the noise "N(f)×Flt_1(f)×D(f)" are illustrated.

In a case where the differential filter is applied to the recovered image data of the low-frequency recovery and high-frequency suppression filter Flt_2(f), the amplitude spectrum of the image signal becomes "S(f)×Flt_2(f)×D(f)", and the amplitude spectrum of the noise becomes "N(f)×Flt_2(f)×D(f)". In the graph 403, the abscissa refers to a spatial frequency f, and the ordinate refers to an amplitude spectrum of the recovered image data (low-frequency recovery and high-frequency suppression). In the graph 403, the amplitude spectrum of the image signal "S(f)×Flt_2(f)×D(f)" and the amplitude spectrum of the noise "N(f)×Flt_2(f)×D(f)" are illustrated. In this example, in a case where the high-frequency recovery filter Flt_1(f) is applied, the S/N ratio of the difference absolute value has an evaluation value of 0.7 as expressed in the following Formula (2). Meanwhile, in a case where the low-frequency recovery and high-frequency suppression filter Flt_2(f) is applied, the S/N ratio of the difference absolute value has an evaluation value of 3.7 as expressed in the following Formula (3).

$$S/N \text{ ratio} = \frac{\sum\{S(f) \times \text{Flt}\_1(f) \times D(f)\}}{\sum\{N(f) \times \text{Flt}\_1(f) \times D(f)\}} = 0.7 \quad (2)$$

$$S/N \text{ ratio} = \frac{\sum\{S(f) \times \text{Flt}\_2(f) \times D(f)\}}{\sum\{N(f) \times \text{Flt}\_2(f) \times D(f)\}} = 3.7 \quad (3)$$

From the aforementioned result, it is recognized that there are a case where the pre-recovery image data is preferably used in the correlation determination and a case where the recovered image data is preferably used in the correlation determination, depending on the frequency characteristics of the recovery filter. That is, the S/N ratio in a case where the pre-recovery image data is used in the correlation determination becomes "2.2" as expressed in Formula (1), but the S/N ratio in a case where the recovered image data is used by applying the high-frequency recovery filter becomes "0.7" as expressed in Formula (2). That is, since the value of the S/N ratio calculated from Formula (1) is greater than the value of the S/N ratio calculated from Formula (2), the image quality is improved by using the pre-recovery image data in the correlation determination in a case where the high-frequency recovery filter is used in the recovery processing.

Meanwhile, the S/N ratio in a case where the recovered image data is used by applying the low-frequency recovery and high-frequency suppression filter becomes "3.7" as expressed in Formula (3). That is, since the value of the S/N ratio calculated from Formula (3) is greater than the value of the S/N ratio calculated from Formula (1), the image quality is improved by using the recovered image data in the correlation determination in a case where the low-frequency recovery and high-frequency suppression filter is used in the recovery processing.

In this manner, it is recognized that there are a case where the pre-recovery image data is preferably used in the correlation determination and a case where the recovered image data is preferably used in the correlation determination, depending on the frequency characteristics of the recovery filter. However, in the technique of Japanese Patent Laid-Open No. 2015-109562, only the pre-recovery image data is used in the correlation determination. For this reason, in the technique of Japanese Patent Laid-Open No. 2015-109562, it is difficult to obtain desirable image quality by effectively improving sharpness without amplifying noise in a case where the low-frequency recovery and high-frequency suppression filter is used in the recovery processing. In this regard, in the image processing apparatus according to this embodiment, the image data used in the correlation determination is switched. In this configuration, it is possible to obtain desirable image quality depending on the recovery characteristics of sharpness. Note that, although it is assumed that white noise having a constant strength regardless of frequency is employed in the aforementioned description, a type of the noise is not limited to the white noise. A similar phenomenon occurs under a similar relationship of the S/N ratio.

First Embodiment

An embodiment according to the invention will be described with reference to the accompanying drawings. Note that the configurations described in the first embodiment are merely for illustrative purposes, and are not intended to limit the scope of the invention.
(Whole Configuration of Image Processing Apparatus)

Figure 5:
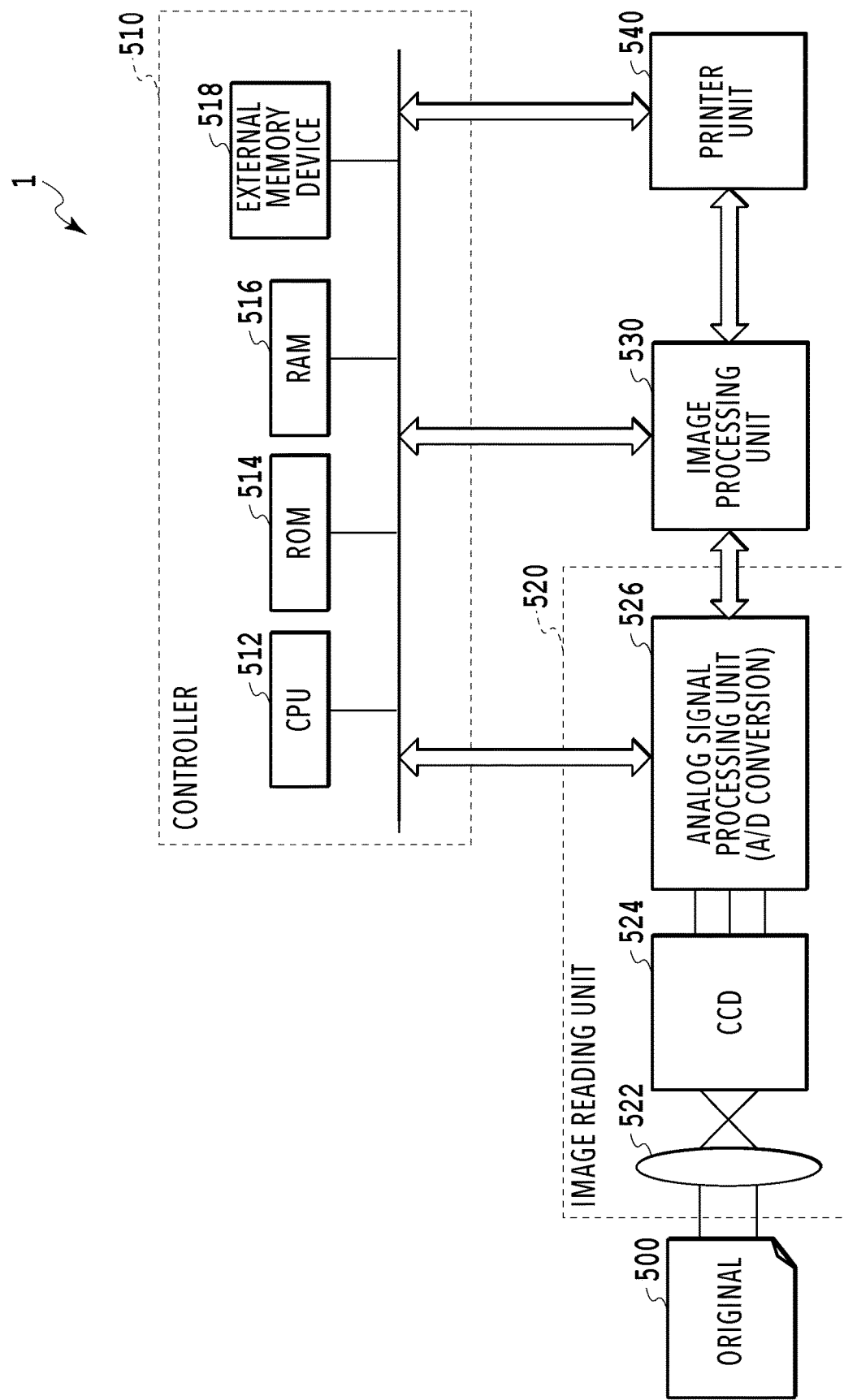
FIG. 5 is a block diagram illustrating an exemplary whole configuration of an image processing apparatus according to a first embodiment.

FIG. 5 is a block diagram illustrating an exemplary whole configuration of the image processing apparatus according to the first embodiment. Referring to FIG. 5, an image reading unit 520 has a lens 522, a charged coupled device (CCD) sensor 524, and an analog signal processing unit 526. An image of an original 500 focused on the CCD sensor 524 through the lens 522 is converted into analog electrical signals of red (R), green (G), and blue (B) colors by the CCD sensor 524. Note that, according to the first embodiment, the original 500 is read by the image reading unit 520, and the original 500 may include a photograph, illustration, or the like without limiting to a document.

The image information converted into the analog signal is input to the analog signal processing unit 526, and correction or the like is performed for each of the R, and B colors. Then, analog-to-digital (A/D) conversion is performed. The converted digital image data signal is input to the image processing unit 530. The image processing unit 530 applies an input correction processing, a recovery and noise reduction processing, color space conversion, a density correction processing, and a halftone processing described below to the image data signal, and the image data signal subjected to these processings is output to a printer unit 540. The printer unit 540 has a printout unit (not illustrated) such as a raster plotter, for example, using an inkjet head or a thermal head and records an image on a recording medium on the basis of the input image data signal.

The controller 510 has a central processing unit (CPU) 512 for controlling computation, a read-only memory (ROM) 514 that stores fixed data or programs, a random access memory (RAM) 516 used to temporarily store data or load programs, and an external storage device 518. The controller 510 controls the image reading unit 520, the image processing unit 530, and the printer unit 540 and comprehensively controls a sequence of the image processing apparatus 1 according to the first embodiment. The external storage device 518 is a storage medium such as a hard disk drive that stores parameters or programs used in the image processing apparatus 1 according to the first embodiment, and the data or programs of the RAM 516 may be loaded from the external storage device 518.
(Circuit Configuration of Image Processing Unit)

Figure 6:
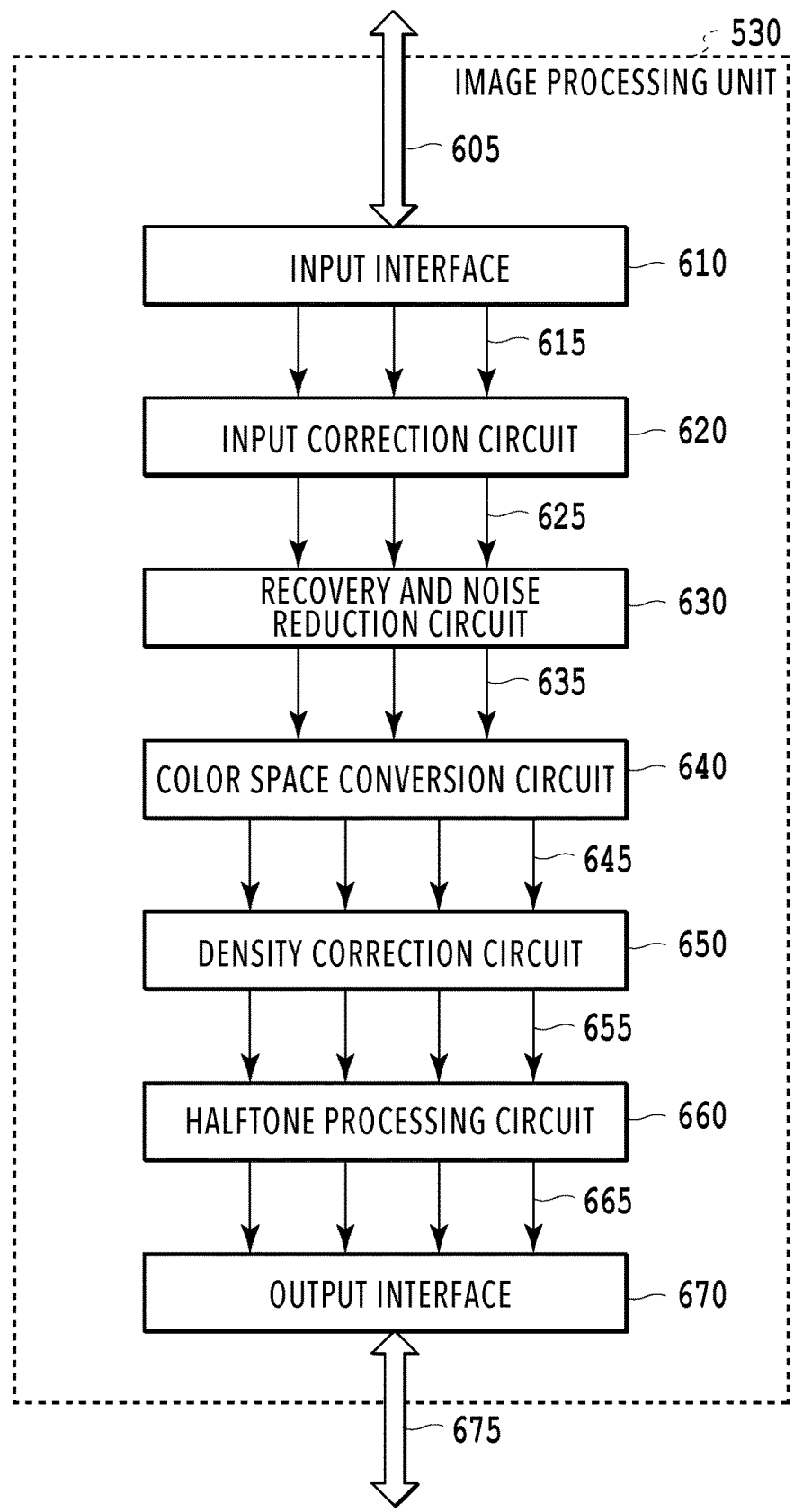
FIG. 6 is a block diagram illustrating an exemplary circuit configuration of the image processing unit according to the first embodiment.

Next, the image processing unit 530 of FIG. 5 will be described in details. FIG. 6 is a block diagram illustrating an exemplary circuit configuration of the image processing unit 530 according to the first embodiment.

The image data signal is input from the analog signal processing unit 526 to the image processing unit 530 via the bus 605, so that the following image processing is executed. The image processing unit 530 has an input interface 610, an input correction circuit 620, a recovery and noise reduction circuit 630, a color space conversion circuit 640, a density correction circuit 650, a halftone processing circuit 660, and an output interface 670. Functions of each of the input correction circuit 620, the recovery and noise reduction circuit 630, the color space conversion circuit 640, the density correction circuit 650, and the halftone processing circuit 660 will be described.
(Input Correction Unit)

An image data signal 615 is input to the input correction circuit 620 via the input interface 610. The image data signal 615 includes brightness signals of R, G, and B colors. The input correction circuit 620 performs a process for correcting a variation of characteristics of a sensor that reads the original 500 or light distribution characteristics of an illumination lamp for the image data signal 615.
(Recovery and Noise Reduction Circuit)

The image data signal (brightness signals R, and B) 625 output from the input correction circuit 620 is input to the recovery and noise reduction circuit 630. The recovery and noise reduction circuit 630 performs a recovery processing and a noise reduction processing for the image data signal (brightness signals R, and B) 625.
(Color Space Conversion Circuit)

The image data signal (brightness signals R, and B) 635 output from the recovery and noise reduction circuit 630 is input to the color space conversion circuit 640. The color space conversion circuit 640 converts the brightness signals R, and B of the image data signal 635 into an image data signal 645 including density signals of cyan (C), magenta (M), yellow (Y), and black (K) colors.
(Density Correction Circuit)

The image data signal (density signals C, M, Y, and K) 645 output from the color space conversion circuit 640 is input to the density correction circuit 650. The density correction circuit 650 corrects density considering characteristics of the halftone processing such that no change occurs in the density in a case where the image data signal (density signals C, M, Y, and K) 645 is binarized by the halftone processing circuit 660.
(Halftone Processing Circuit)

An image data signal (density signals C, M, Y, and K) 655 output from the density correction circuit 650 is input to the halftone processing circuit 660. The halftone processing circuit 660 performs a halftone processing for the multi-valued image data signal (density signals C, M, Y, and K) 655 to convert the image data signal 655 into a binarized halftone representation (or two or more multi-values having the number of gradations smaller than the quantity of an input gradation). In addition, a binary image data signal (output signals C, M, Y, and K) 656 is output to the printer unit 540 via the output interface 670 and a bus 675.
(Image Processing in Recovery and Noise Reduction Circuit)

Figure 7:
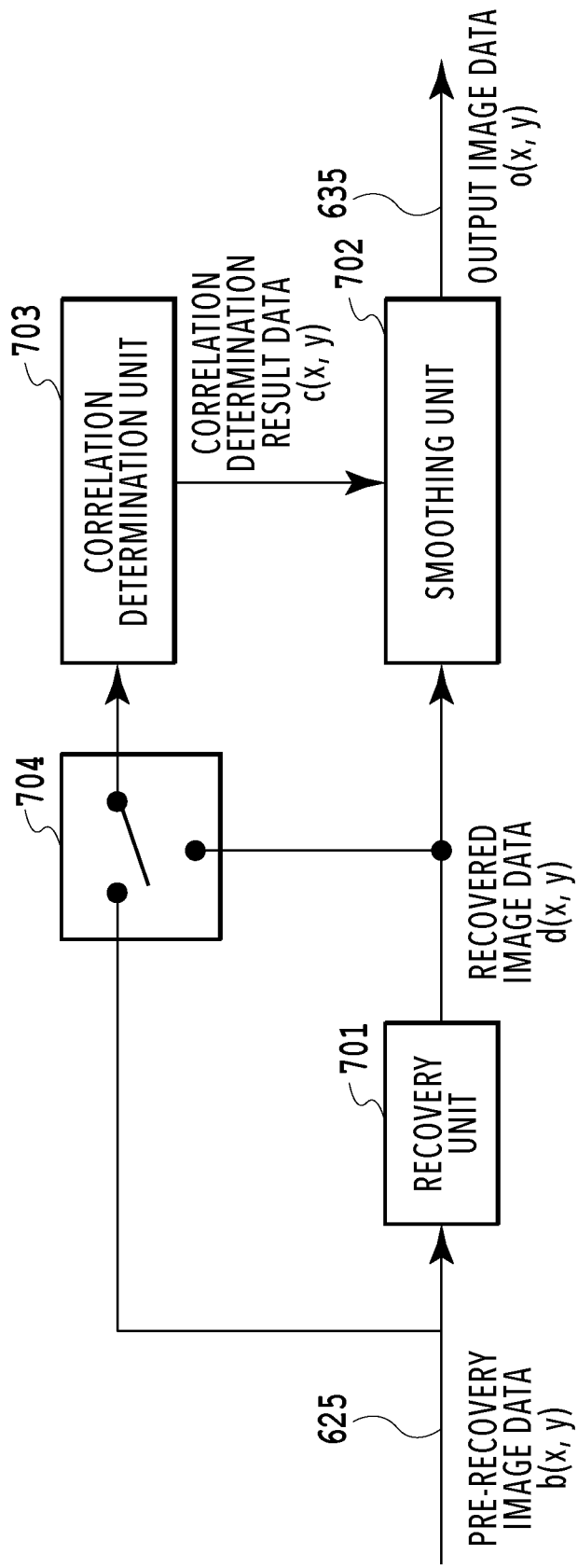
FIG. 7 is a block diagram illustrating an exemplary configuration for applying a recovery and noise reduction process according to the first embodiment.
Figure 8:
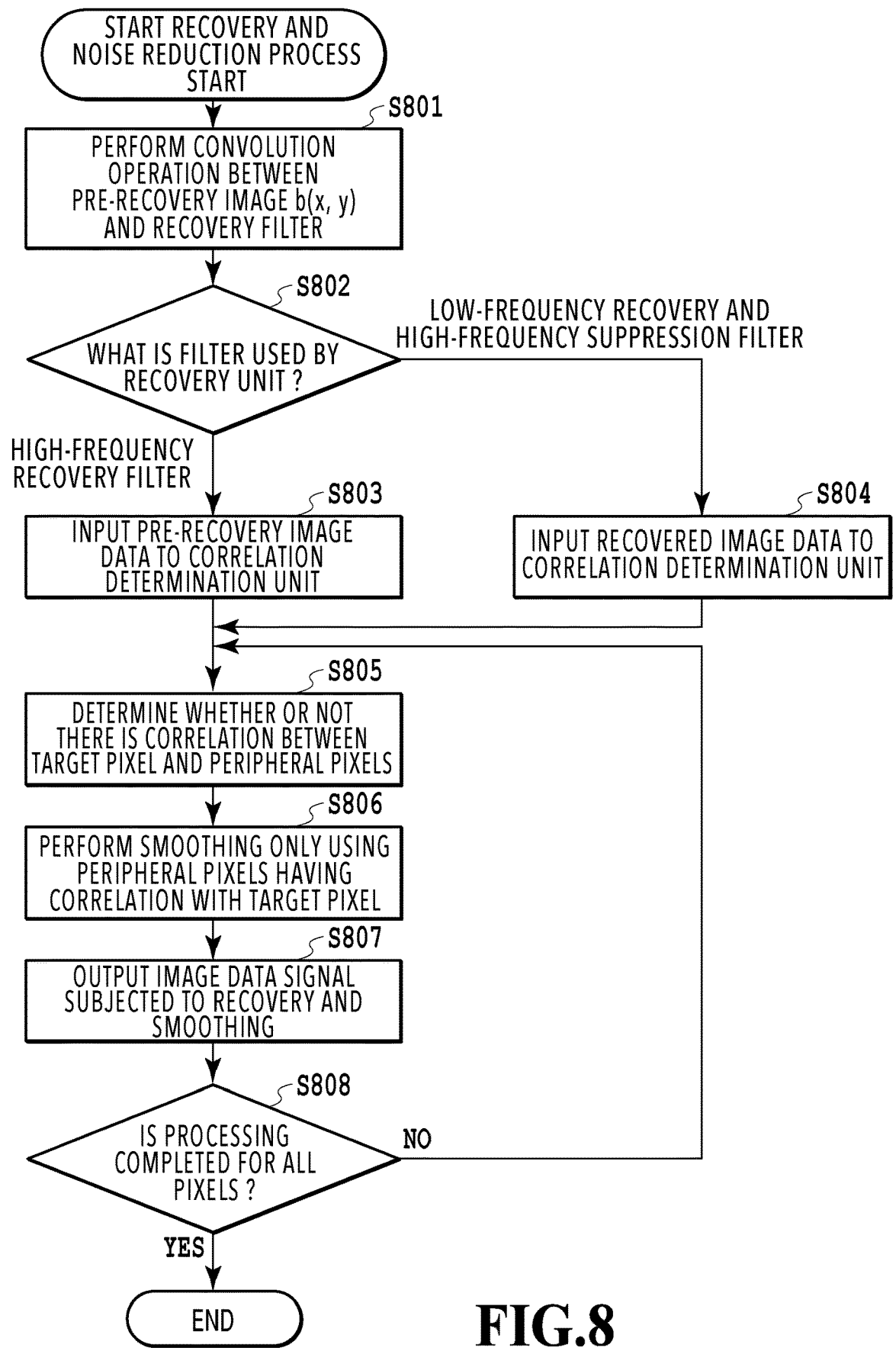
FIG. 8 is a flowchart illustrating an exemplary recovery and noise reduction process according to the first embodiment.

Next, the image processing performed in the recovery and noise reduction circuit 630 will be described with reference to the block diagram of FIG. 7 and the flowchart of FIG. 8. In the recovery and noise reduction circuit 630, the same processing is applied to each color component of the image data signal. FIG. 7 is a block diagram illustrating an exemplary configuration for applying the recovery and noise reduction process to a single color component. FIG. 8 is a flowchart illustrating an exemplary recovery and noise reduction process for a single color component. Note that the reference symbol "S" denotes a step of the flowchart in the following description.

In FIG. 7, "b(x, y)" refers to a color component of an image data signal 625 output from the input correction circuit 620. In this case, "x" and "y" designate a pixel position in the image represented by the image data signal 625. In addition, a resolution of this image is set to 600 dpi. In the following description, "b(x, y)" will be called pre-recovery image data.

In S801 of the flowchart of FIG. 8, a recovery unit 701 performs a convolution operation between the pre-recovery image data b(x, y) and the recovery filter to create recovered image data d(x, y) having recovered sharpness.

According to the first embodiment, the recovery filter can change the recovery characteristics of the sharpness by changing a parameter. The change of the parameter is performed as the recovery unit 701 changes a frequency characteristic of the recovery filter in response to a user's command input from an input unit (not illustrated). For example, the recovery unit 701 can switch the high-frequency recovery filter Flt_1(f) and the low-frequency recovery and high-frequency suppression filter Flt_2(f) illustrated in the graph 301 in response to a change of the parameter of the recovery filter.

The recovery filter may be created, for example, on the basis of the method described in Japanese Patent Laid-Open No. 2015-109562. Specifically, assuming that the MTF of the image reading unit 520 is set to "H(u, v)", the recovery filter is created by performing inverse Fourier transformation for its reverse characteristic 1/H(u, v). In this case, "u" and "v" denote spatial frequencies. Although the size of the recovery filter is set to "11×11" in the first embodiment, the filter size is not limited thereto. A necessary filter size may be set depending on the recovery characteristics.

Typically, the image data signal obtained from the image reading unit 520 has sharpness degraded by influence of an optical system. For this reason, the amplitude characteristic is smaller than "1" across overall spatial frequencies f excluding "f=0 cycle/mm", and its reverse characteristic "1/H(u, v)" has an amplitude characteristic larger than "1" across overall spatial frequencies f excluding "f=0 cycle/mm". For this reason, the recovery filter created by performing inverse Fourier transformation for the reverse characteristic 1/H(u, v) becomes the high-frequency recovery filter described above.

Meanwhile, the low-frequency recovery and high-frequency suppression filter is created by performing inverse Fourier transformation by applying a low-pass filtering property to the reverse characteristic 1/H(u, v) such that an amplitude characteristic of a high-frequency region is smaller than "1". Specifically, the low-frequency recovery and high-frequency suppression filter is assumed to be a filter having a maximum amplitude characteristic larger than "1" in a low-frequency region lower than a half of the Nyquist frequency and a minimum amplitude characteristic smaller than "1" in a high-frequency region higher than a half of the Nyquist frequency. Note that, since the image resolution is set to 600 dpi in the first embodiment as described above, the Nyquist frequency is about 11.8 cycles/mm (=600÷25.4÷2 cycles/mm).

A switching unit 704 switches a type of the image data used in the correlation determination. For example, in a case where a high-frequency recovery filter is used in the recovery unit 701, the switching unit 704 is set such that the pre-recovery image data is transmitted to a correlation determination unit 703. Meanwhile, in a case where the low-frequency recovery and high-frequency suppression filter is used in the recovery unit 701, the switching unit 704 is set such that the recovered image data is transmitted to the correlation determination unit 703. In this manner, the switching unit 704 switches between a mode in which a pixel value of the pre-recovery image data is used in the correlation determination and a mode in which a pixel value of the recovered image data is used in the correlation determination, depending on the frequency characteristics of the recovery filter. For this reason, it is possible to obtain desirable image quality regardless of a frequency characteristic of the recovery filter.

In S802, the recovery and noise reduction circuit 630 determines a filter used by the recovery unit 701 in the recovery processing. In a case where the recovery filter is the high-frequency recovery filter (S802: YES), the process advances to S803, and the switching unit 704 is set such that the pre-recovery image data is transmitted to the correlation determination unit 703. Meanwhile, in a case where the recovery filter is the low-frequency recovery and high-frequency suppression filter (S802: NO), the process advances to S804, and the switching unit 704 is set such that the recovered image data is transmitted to the correlation determination unit 703.

Similar to the smoothing units 102 and 202 and the correlation determination units 103 and 203 described above, a smoothing unit 702 and the correlation determination unit 703 perform the edge-saving type noise reduction process similar to that of the technique of Japanese Patent No. 3334776.

In S805, the correlation determination unit 703 determines whether or not there is a correlation between the target pixel and the peripheral pixels in the target region.

In S806, the smoothing unit 702 performs smoothing only using peripheral pixels having a correlation with the target pixel on the basis of the recovered image data d(x, y) and the correlation determination result data c(x, y) output from the correlation determination unit 703. In addition, the smoothing unit 702 outputs the value obtained through the smoothing as a value of the target pixel. The output image data o(x, y) obtained through the aforementioned method is output to the color space conversion circuit 640 as one brightness signal of an image data signal 535. The process of S805 to S806 will be described in details with reference to FIG. 9.

FIG. 9 is schematic diagrams each illustrating an exemplary target region having 3×3 pixels adjacent to the target pixel. The target pixel (or pixels corresponding to the target pixel position) is a center pixel indicated by a bold line in target regions 901 to 905 and is given a subscript of "11". The reference symbol $b_{ij}$ of the target region 901 denotes a pixel value of the pre-recovery image data b(x, y), and the reference symbol $d_{ij}$ of the target region 902 denotes a pixel value of the recovered image data d(x, y). The reference symbol $c_{ij}$ of the target region 903 denotes correlation determination result data c(x, y) output from the correlation determination unit 703.

In a case where the pre-recovery image data is used in the correlation determination, the correlation determination result data $c_{ij}$ is created on the basis of Formula (4) described below. In a case where the recovered image data is used in the correlation determination, the correlation determination result data $c_{ij}$ is created on the basis of Formula (5) described below. In this case, the pixel value determined as "there is a correlation" is set to "$c_{ij}=1$", and the pixel value determined as "there is no correlation" is set to "$c_{ij}=0$". That is, the correlation determination unit 703 obtains a difference absolute value of the pixel value between the target pixel and the peripheral pixels in the target region with reference to the pre-recovery image data or the recovered image data, and determines whether or not the difference absolute value is larger than a predetermined correlation determination threshold value Th.

The target region 904 is a specific example of the target region of the pre-recovery image data or the recovered image data. The target region 905 illustrates a result of applying correlation determination to the target region 904 in a case where the correlation determination threshold value Th is set to "5". In the specific example of FIG. 9, the target region size is set to 3×3 pixels, and the difference absolute value is calculated between the target pixel and the adjacent pixels. For this reason, an amplitude characteristic of the correlation determination is similar to that of the graph 303 in horizontal and vertical directions with respect to the target pixel, and becomes √2 times the horizontal scale of the graph 303 in a diagonal direction with respect to the target pixel. That is, as described in the specific example of FIG. 9, the amplitude characteristic of the differential filter is established similarly to that of the one-dimensional image data described above even in two-dimensional image data having a target region size of 3×3 pixels.

$$c_{ij} = \begin{cases} 1 & (\text{If } |b_{ij} - b_{11}| \leq Th) \\ 0 & (\text{If } |b_{ij} - b_{11}| > Th) \end{cases} \quad (4)$$

$$c_{ij} = \begin{cases} 1 & (\text{If } |d_{ij} - d_{11}| \leq Th) \\ 0 & (\text{If } |d_{ij} - d_{11}| > Th) \end{cases} \quad (5)$$

The smoothing unit 702 averages the pixel value $d_{ij}$ of the recovered image data of the pixel ($c_{ij}=1$) determined as having a correlation. For example, in a case where the correlation determination result becomes the target region 905, the averaged value $d_{avg}$ becomes "$(d_{00}+d_{10}+d_{20}+d_{01}+d_{11}+d_{21})\div 6$". In addition, the target pixel value $d_{11}$ is substituted with the averaged value $d_{avg}$.

In S807, the recovery and noise reduction circuit 630 outputs the output image data o(x, y).

In S808, it is determined whether or not the process of S805 to S807 is completed for overall pixels of the recovered image data d(x, y). In a case where the process is not completed for overall pixels (S808: NO), the process returns to S805. In a case where the process is completed for overall pixels (S808: YES), this flowchart is terminated.

As described above, using the image processing apparatus according to the first embodiment, it is possible to improve sharpness and reduce noise regardless of a frequency characteristic of the filter used in the recovery processing by applying the edge-saving type noise reduction process to the recovered image data. Specifically, the switching unit 704 can switch the image used in the correlation determination depending on sharpness recovery characteristics. Therefore, it is possible to effectively improve sharpness of the input image regardless of the sharpness recovery characteristics.

Note that the effect of the switching unit 704 is particularly significant when the target region used in the correlation determination has a size of 3×3 pixels as in this embodiment. The reason will be described.

In a case where the target region has a size of 3×3 pixels as illustrated in FIG. 9, the pixel value difference between the target pixel and the adjacent pixels is used in the correlation determination. Therefore, the amplitude characteristic D(f) of the differential filter increases as the spatial frequency increases as illustrated in the graph 303. For this reason, influence of noise becomes significant by performing the correlation determination on the basis of the recovered image data obtained by applying the high-frequency recovery filter. That is, in a case where the high-frequency recovery filter is used in the recovery processing, and the target region having a size of 3×3 pixels is used in the correlation determination, the image quality is significantly degraded by performing the correlation determination on the basis of the recovered image data, compared to a case where the correlation determination is performed on the basis of the pre-recovery image data.

Figure 10:
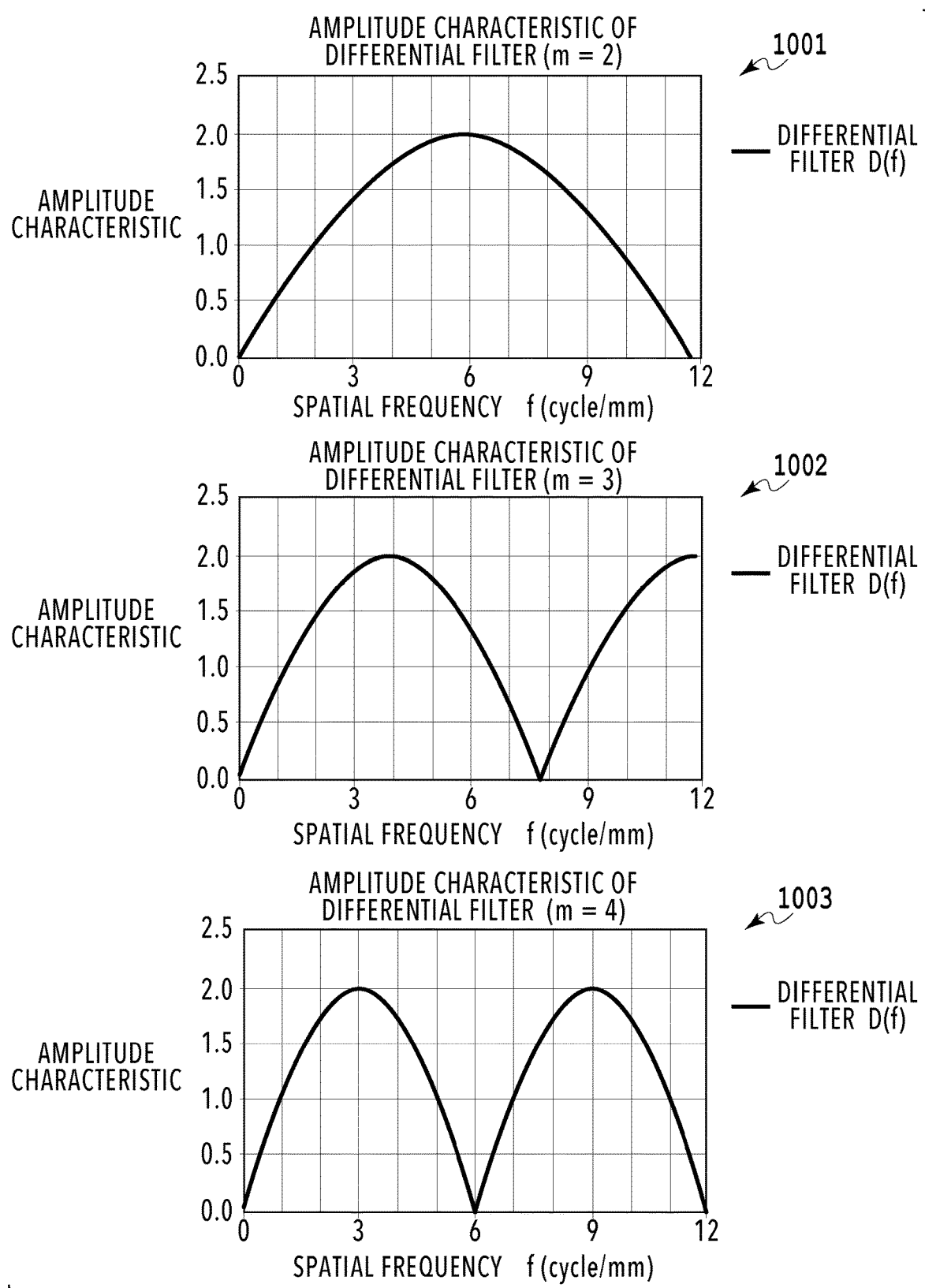
FIG. 10 is graphs each illustrating an amplitude characteristic of a differential filter.

Meanwhile, in a case where the size of the target region is larger than 3×3 pixels, the correlation determination is performed on the basis of the pixel value difference with pixels distant from the target pixel by two or more pixels in addition to the pixel value difference between the target pixel and the adjacent pixels. The pixel value difference between the target pixel and the pixels distant from the target pixel by two or more pixels has a peak at a spatial frequency lower than a half of the Nyquist frequency. This is because a transfer function of the differential filter used to obtain the pixel value difference between the target pixel and the pixels distant from the target pixel by "m" pixels becomes "$\exp(-j\pi mf/f_N)-1$" on the basis of the signal processing theory known in the art. The amplitude characteristic thereof becomes "$\sqrt{(2(1-\cos(\pi mf/f_N))}$". For example, assuming that "m=2, 3, and 4", the amplitude characteristics become the graphs 1001, 1002, and 1003 of FIG. 10, respectively.

In this manner, in a case where the size of the target region is larger than 3×3 pixels, a percentage of the low-frequency component in the S/N ratio of the difference absolute value increases, compared to the value of the original S/N ratio. Therefore, the image quality is less degraded by performing the correlation determination using the recovered image data obtained by applying the high-frequency recovery filter. That is, in a case where the high-frequency recovery filter is used in the recovery processing, and the a target region having a size sufficiently larger than 3×3 pixels is used in the correlation determination, a difference of image quality is insignificant in both a case where the correlation determination is performed on the basis of the recovered image data and a case where the correlation determination is performed on the basis of the pre-recovery image data.

Meanwhile, in a case where the low-frequency recovery and high-frequency suppression filter is used in the recovery processing, the value of the S/N ratio increases by performing the correlation determination on the basis of the recovered image data as the size of the target region increases. For this reason, the image quality is improved by performing the correlation determination on the basis of the recovered image data regardless of the size of the target region used in the correlation determination.

In summary, it is desirable to use the pre-recovery image data in the correlation determination in a case where the high-frequency recovery filter is used in the recovery processing, and the target region has a size of 3×3 pixels. In other cases, it can be said that there is no problem even when the recovered image data is used in the correlation determination. That is, in a case where the target region has a size of 3×3 pixels, it is possible to obtain an effect of remarkably improving image quality by switching the image data used in the correlation determination depending on the recovery characteristics. Meanwhile, in a case where the target region has a size larger than 3×3 pixels, it is possible to suppress degradation of image quality without providing the switching unit 704 in the recovery and noise reduction circuit 630 by using the recovered image data in the correlation determination regardless of the recovery characteristics.

Second Embodiment

As described above, a case where the high-frequency recovery filter is used in the recovery processing and the target region has a size of 3×3 pixels can be considered as a use case where image quality can be remarkably improved by using the pre-recovery image data in the correlation determination. For this reason, it is desirable that only the high-frequency recovery filter is used in the recovery processing, and the correlation determination is performed on the basis of the pre-recovery image data at all times in a case where the target region has a size of 3×3 pixels. In this regard, the recovery and noise reduction circuit 630 according to the second embodiment is configured such that the correlation determination is performed on the basis of the pre-recovery image data at all times by removing the switching unit 704 from the configuration of FIG. 7. In this case, the recovery unit 701 performs the recovery processing only using the high-frequency recovery filter, and the correlation determination unit 703 performs the correlation determination using the target region having size of 3×3 pixels.

As described above, according to the second embodiment, only the high-frequency recovery filter is used in the recovery processing, and the target region has a size of 3×3 pixels. As a result, it is possible to obtain desirable image quality. That is, according to the second embodiment, it is possible to reduce cost for mounting the switching unit 704 on the image processing unit 530 without degrading image quality.

Other Embodiments

Note that, although the image processing unit 530 switches the image used in the correlation determination depending on the sharpness recovery characteristics in the first embodiment, a criterion of determination on which image is used in the correlation determination is not limited to the recovery characteristics. For example, the image processing unit 530 may determine the type of the recovery filter, evaluate the image quality of the image output by using the pre-recovery image data in the correlation determination and the image quality of the image output by using the recovered image data, and then employ one of the pre-recovery image data and the recovered image data having better image quality. In this case, in a case where the image quality is improved by using the pre-recovery image data, the pre-recovery image data is used in the correlation determination. In comparison, in a case where the image quality is improved by using the recovered image data, the recovered image data is used in the correlation determination. Alternatively, the image data used in the correlation determination may be switched depending on the operation mode set by a user, such as the type of recording medium and recording quality. In this case, instead of only the image data used in the correlation determination, both the filter characteristic and the image data used in the correlation determination may be changed simultaneously depending on the operation mode set by a user.

Although the high-frequency recovery filter of the first embodiment has an amplitude characteristic larger than "1" across overall spatial frequencies excluding a frequency "f=0 cycle/mm", the invention is not limited thereto. For example, the high-frequency recovery filter may have an amplitude characteristic in which an average value of the amplitude characteristic corresponding to the frequency component higher than a half of the Nyquist frequency is larger than an average value of the amplitude characteristic corresponding to the frequency component lower than a half of the Nyquist frequency. Alternatively, the high-frequency recovery filter may have an amplitude characteristic in which the maximum value of the amplitude characteristic of the frequency component higher than a half of the Nyquist frequency is larger than a predetermined threshold value.

In the first embodiment, the low-frequency recovery and high-frequency suppression filter has a maximum value of the amplitude characteristic larger than "1" for a frequency component lower than a half of the Nyquist frequency and a minimum value of the amplitude characteristic smaller than "1" for a frequency component higher than a half of the Nyquist frequency. However, the low-frequency recovery and high-frequency suppression filter is not limited to that described above. For example, the low-frequency recovery and high-frequency suppression filter may have an average value of the amplitude characteristic corresponding to the frequency component higher than a half of the Nyquist frequency set to be smaller than an average value of the amplitude characteristic corresponding to the frequency component lower than a half of the Nyquist frequency. Alternatively, the low-frequency recovery and high-frequency suppression filter may have a maximum value of the amplitude characteristic for the frequency component higher than a half of the Nyquist frequency set to be smaller than a predetermined threshold value.

Although the correlation determination unit 703 of the first embodiment uses the difference absolute value in the correlation determination, a difference level between blocks may be employed as in the non-local means method. In addition, although the switching unit 704 of the first embodiment outputs the pre-recovery image data or the recovered image data to the correlation determination unit 703, an image data created by blending such image data may be output to the correlation determination unit 703. That is, the switching unit 704 may output an image created by blending pixel values of the same coordinates as those of the pre-recovery image and the recovered image at a predetermined ratio to the correlation determination unit 703.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the invention, it is possible to implement a noise reduction process depending on sharpness recovery characteristics.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-102955, filed May 24, 2017, which is hereby incorporated by reference wherein in its entirety.

What is claimed is:

1. An image processing apparatus comprising:
a sharpness recovery unit configured to recover sharpness of an input image;
a correlation determination unit configured to determine a correlation between a target pixel and peripheral pixels of the input image;
a noise removal unit configured to perform smoothing of the target pixel determined as having a correlation with the peripheral pixels in a recovered image output from the sharpness recovery unit; and
a switching unit configured to switch between a mode in which the correlation determination unit uses the target pixel and the peripheral pixels of the pre-recovery input image in the correlation determination and a mode in which the correlation determination unit uses the target pixel and the peripheral pixels of the recovered input image in the correlation determination, depending on recovery characteristics used in the recovery of the sharpness of the input image.

2. The image processing apparatus according to claim 1, wherein the sharpness recovery unit can change the recovery characteristics by changing a parameter.

3. The image processing apparatus according to claim 1, wherein the correlation determination unit uses the target pixel and the peripheral pixels of the pre-recovery input image in the correlation determination in a case where the recovery characteristics indicate that the sharpness of the input image is recovered for a frequency component higher than a first frequency, and
the correlation determination unit uses the target pixel and the peripheral pixels of the recovered input image in the correlation determination in a case where the recovery characteristics indicate that recovery of the sharpness of the input image is suppressed for a frequency component higher than the first frequency.

4. The image processing apparatus according to claim 3, wherein the first frequency is set to a half of the Nyquist frequency.

5. The image processing apparatus according to claim 1, wherein the correlation determination unit uses pixel values of a 3×3 pixel region adjacent to the target pixel of the input image in the correlation determination.

6. The image processing apparatus according to claim 5, wherein the correlation determination unit determines that the target pixel of the input image has a correlation with the adjacent pixels in a case where a difference absolute value of the pixel value between the target pixel and the adjacent pixels of the input image is smaller than a predetermined threshold value.

7. The image processing apparatus according to claim 1, wherein the correlation determination unit uses pixel values of the 3×3 pixel region adjacent to the target pixel of the pre-recovery input image in the correlation determination in a case where the recovery characteristics indicate that an amplitude characteristic corresponding to a frequency component higher than a second frequency is larger than "1".

8. The image processing apparatus according to claim 7, wherein the second frequency is set to "0 cycle/mm".

9. The image processing apparatus according to claim 1, further comprising an image reading unit configured to obtain the input image.

10. The image processing apparatus according to claim 1, further comprising an output unit configured to output an image smoothened by the noise removal unit.

11. An image processing method comprising:
recovering sharpness of an input image;
determining a correlation between a target pixel and peripheral pixels of the input image;
performing smoothing of the target pixel determined as having a correlation with the peripheral pixels in a recovered image output in the sharpness recovery; and
switching between a mode in which the target pixel and the peripheral pixels of the pre-recovery input image are used in the correlation determination and a mode in which the target pixel and the peripheral pixels of the recovered input image are used in the correlation determination, depending on recovery characteristics used in the recovery of the sharpness of the input image.

12. The image processing method according to claim 11, wherein the recovery characteristics can be changed by changing a parameter in the sharpness recovery.

13. The image processing method according to claim 11, wherein the target pixel and the peripheral pixels of the pre-recovery input image are used in the correlation determination in a case where the recovery characteristics indicate that the sharpness of the input image is recovered for a frequency component higher than a first frequency, and
the target pixel and the peripheral pixels of the recovered input image are used in the correlation determination in a case where the recovery characteristics indicate that recovery of sharpness of the input image is suppressed for a frequency component higher than the first frequency.

14. The image processing method according to claim 13, wherein the first frequency is set to a half of the Nyquist frequency.

15. The image processing method according to claim 11, wherein pixel values of a 3×3 pixel region adjacent to the target pixel of the input image are used in the correlation determination.

16. The image processing method according to claim 15, wherein, in the correlation determination, it is determined that the target pixel of the input image has a correlation with the adjacent pixels in a case where a difference absolute value of the pixel value between the target pixel and the adjacent pixels of the input image is smaller than a predetermined threshold value.

17. The image processing method according to claim 11, wherein pixel values of a 3×3 pixel region adjacent to the target pixel of the pre-recovery input image are used in the correlation determination in a case where the recovery characteristics indicate that an amplitude characteristic corresponding to a frequency component higher than a second frequency is larger than "1".

18. The image processing method according to claim 17, wherein the second frequency is set to "0 cycle/mm".

19. The image processing method according to claim 11, further comprising obtaining the input image using an image reading unit.

20. A non-transitory computer readable storage medium storing a program for causing a computer to function as an image processing apparatus,
   where the image processing apparatus comprises:
   a sharpness recovery unit configured to recover sharpness of an input image;
   a correlation determination unit configured to determine a correlation between a target pixel and peripheral pixels of the input image;
   a noise removal unit configured to perform smoothing of the target pixel determined as having a correlation with the peripheral pixels in a recovered image output from the sharpness recovery unit; and
   a switching unit configured to switch between a mode in which the correlation determination unit uses the target pixel and the peripheral pixels of the pre-recovery input image in the correlation determination and a mode in which the correlation determination unit uses the target pixel and the peripheral pixels of the recovered input image in the correlation determination, depending on recovery characteristics used in the recovery of the sharpness of the input image.

* * * * *